US012146438B2

(12) United States Patent
Konopaske et al.

(10) Patent No.: US 12,146,438 B2
(45) Date of Patent: Nov. 19, 2024

(54) GAS TURBINE ENGINE COMPONENT WITH INTEGRATED SENSOR BRACKET

(71) Applicant: RAYTHEON TECHNOLOGIES CORPORATION, Farmington, CT (US)

(72) Inventors: Zachary Paul Konopaske, West Hartford, CT (US); Austin Warmuth, Oceanside, CA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/168,086

(22) Filed: Feb. 13, 2023

(65) Prior Publication Data

US 2024/0271561 A1 Aug. 15, 2024

(51) Int. Cl.
F02C 3/04 (2006.01)

(52) U.S. Cl.
CPC ............ F02C 3/04 (2013.01); F05D 2230/30 (2013.01); F05D 2300/6033 (2013.01)

(58) Field of Classification Search
CPC .... F01C 25/243; F01C 25/246; F01C 25/285; F01C 5/048; F01C 11/12; F01C 11/122; F01C 11/125; F01C 21/003; F01C 17/02; F01D 25/243; F01D 25/246; F01D 25/285; F01D 5/048; F01D 11/12; F01D 11/122; F01D 11/125; F01D 21/003; F01D 17/02
See application file for complete search history.

(56) References Cited

U.S. PATENT DOCUMENTS

| 6,838,157 | B2 * | 1/2005 | Subramanian | F23R 3/007 428/173 |
| 9,017,021 | B2 | 4/2015 | Verseux et al. | |
| 9,071,888 | B2 * | 6/2015 | Subramanian | F01D 17/02 |
| 10,323,669 | B2 | 6/2019 | Lamouche et al. | |
| 11,149,570 | B2 | 10/2021 | Boisson et al. | |
| 2005/0287386 | A1 * | 12/2005 | Sabol | F01D 17/02 73/776 |
| 2012/0194396 | A1 * | 8/2012 | Mitchell | F01D 17/02 248/220.21 |
| 2013/0121833 | A1 * | 5/2013 | Lucashu | F01D 9/04 416/204 R |
| 2014/0017074 | A1 | 1/2014 | Olivier | |
| 2016/0201515 | A1 | 7/2016 | Chang | |
| 2016/0251272 | A1 | 9/2016 | Weaver et al. | |

(Continued)

FOREIGN PATENT DOCUMENTS

| DE | 102018208003 | 11/2019 |
| EP | 2865195 | 9/2016 |
| EP | 3249174 | 11/2017 |

OTHER PUBLICATIONS

European Search Report for European Patent Application No. 24157433.4 mailed May 29, 2024.

Primary Examiner — Thuyhang N Nguyen
(74) Attorney, Agent, or Firm — Carlson, Gaskey & Olds, P.C.

(57) ABSTRACT

A gas turbine engine component includes a wall that is formed of a ceramic matrix composite (CMC) that has ceramic fiber plies disposed in a ceramic matrix. The component has a sensor section in which a bracket is bonded on the wall for holding a sensor. The bracket is formed of a material selected from the group consisting of the CMC, graphite, and combinations thereof.

7 Claims, 3 Drawing Sheets

(56) References Cited

U.S. PATENT DOCUMENTS

| | | | |
|---|---|---|---|
| 2016/0265367 A1* | 9/2016 | Rosenzweig | C04B 41/52 |
| 2017/0015597 A1* | 1/2017 | Tholen | F01D 25/005 |
| 2018/0274382 A1 | 9/2018 | Vetters et al. | |
| 2018/0297346 A1* | 10/2018 | Aug | B32B 13/06 |
| 2020/0141262 A1* | 5/2020 | Schrewe | F01D 17/085 |

* cited by examiner

GAS TURBINE ENGINE COMPONENT WITH INTEGRATED SENSOR BRACKET

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the combustion section and the turbine section may be formed of a superalloy and may include thermal barrier coatings to extend temperature capability and lifetime. Ceramic matrix composite ("CMC") materials are also being considered for such components. Among other attractive properties, CMCs have high temperature resistance. Despite this attribute, however, there are unique challenges to implementing CMCs.

SUMMARY

A gas turbine engine according to an example of the present disclosure includes a gas turbine engine component that has a wall that is formed of a ceramic matrix composite (CMC) of ceramic fiber plies disposed in a ceramic matrix. The component has a sensor section in which a bracket is bonded on the wall for holding a sensor. The bracket is formed of a material selected from the group consisting of the CMC, graphite, and combinations thereof.

In a further embodiment of any of the foregoing embodiments, the material is the CMC.

In a further embodiment of any of the foregoing embodiments, the ceramic matrix bonds the bracket on the wall.

In a further embodiment of any of the foregoing embodiments, the material is the graphite.

In a further embodiment of any of the foregoing embodiments, the gas turbine engine component includes an over-coating that envelops the bracket to bond the bracket on the wall.

In a further embodiment of any of the foregoing embodiments, the over-coating is SiC.

In a further embodiment of any of the foregoing embodiments, the bracket is a U-bracket that has two upstanding bracket side walls, a header bracket wall that connects the two upstanding bracket side walls, and the wall, the two upstanding bracket side walls, and the header bracket wall together define a sensor receptacle.

In a further embodiment of any of the foregoing embodiments, the gas turbine engine component is an airfoil.

A gas turbine engine according to an example of the present disclosure includes a compressor section, a combustor in fluid communication with the compressor section, and a turbine section in fluid communication with the combustor. The turbine section has an airfoil as in any of the foregoing embodiments, and there is sensor affixed on the airfoil by the bracket.

A method of making a gas turbine engine component according to an example of the present disclosure includes fabricating a wall of a gas turbine engine component by laying-up ceramic fiber plies, consolidating the ceramic fiber plies in a ceramic matrix composite (CMC), and bonding a bracket on the wall. The bracket is formed of a material selected from the group consisting of the CMC, graphite, and combinations thereof. The bonding is conducted during the fabricating of the gas turbine engine component by laying-up additional ceramic fiber plies to form a shape of the bracket, where the consolidating also consolidates the additional ceramic fiber plies in the ceramic matrix material to thereby bond the bracket on the wall, or after the fabricating of the gas turbine engine component by placing the bracket on the wall and then depositing an over-coating that envelops the bracket and the wall to bond the bracket on the wall.

In a further embodiment of any of the foregoing embodiments, the bonding is conducted during the fabricating of the gas turbine engine component by laying-up the additional ceramic fiber plies to form the shape of the bracket.

In a further embodiment of any of the foregoing embodiments, the bonding is conducted after the fabricating of the gas turbine engine component by placing the bracket on the wall and then depositing the over-coating.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
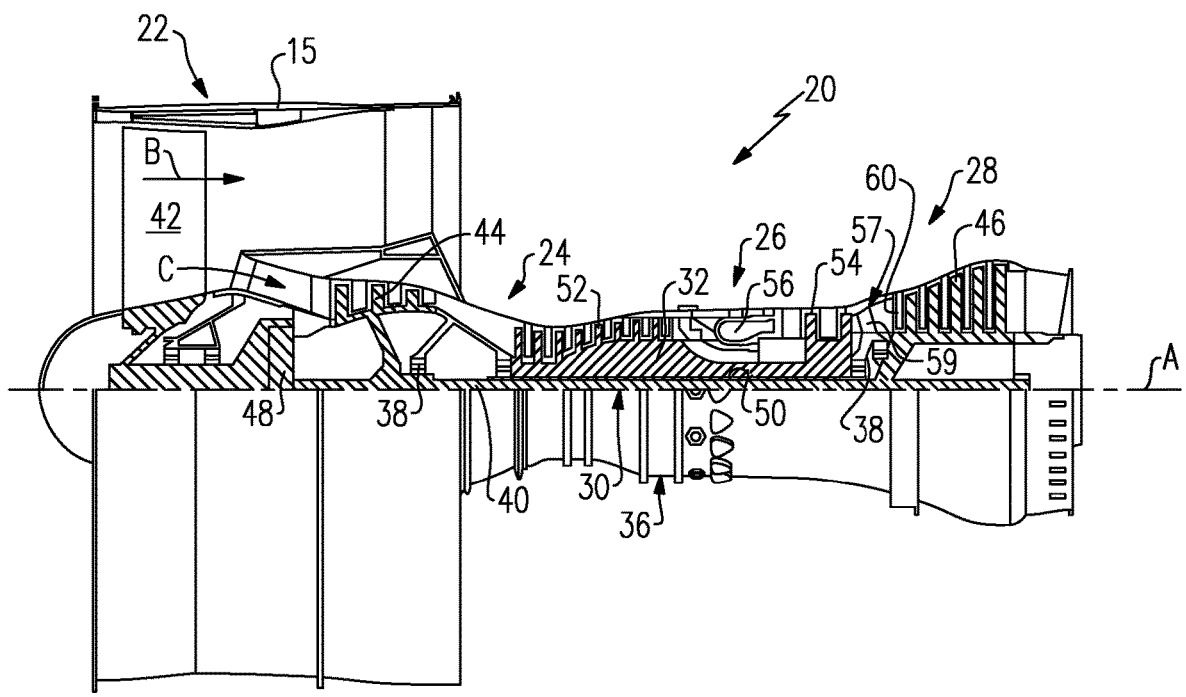
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/see divided by an industry standard temperature correction of $[(Tram° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
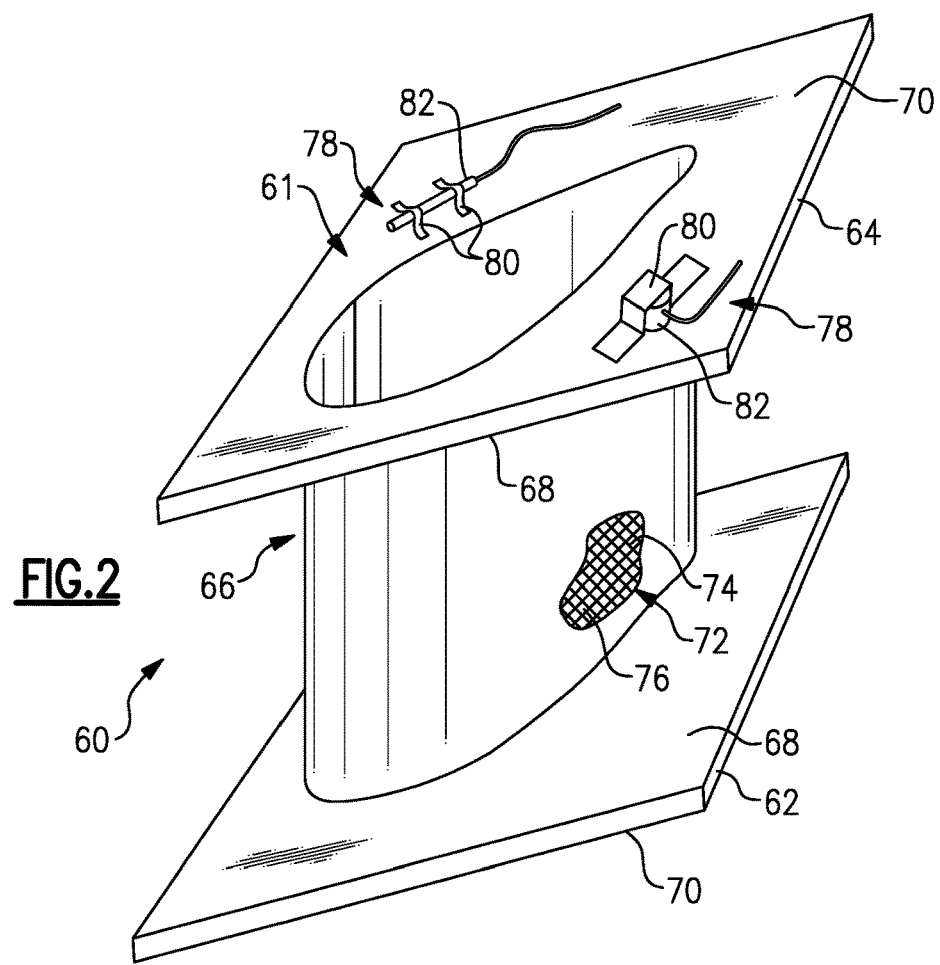
FIG. 2 illustrates a gas turbine engine component.

FIG. 2 illustrates a gas turbine engine component 60. In this example, the component 60 is an airfoil, such as a vane in the turbine section 28. It is to be understood, however, that this disclosure is applicable to other engine components, such as but not limited to, blade outer air seals and combustor panels. In general, the illustrated airfoil is formed of a wall or walls 61 that define(s) inner and outer platforms 62/64 and an airfoil section 66 that extends therebetween. Each of the platforms 62/64 has a gaspath side 68 and a non-gaspath side 70.

The wall or walls 61 is/are made of a ceramic matrix composite (CMC) 72 (shown in cutaway) including ceramic fiber plies 74 disposed in a ceramic matrix 76. Example ceramic matrices 76 are silicon-containing ceramic, such as but not limited to, a silicon carbide (SiC) matrix or a silicon nitride ($Si_3N_4$) matrix. Example ceramic fiber plies 74 are silicon-containing ceramic fibers, such as but not limited to, silicon carbide (SiC) fiber or silicon nitride ($Si_3N_4$) fibers. The CMC 72 may be, but is not limited to, a SiC/SiC ceramic matrix composite in which SiC fiber plies are disposed within a SiC matrix. Ceramic fibers are provided in tows. A tow is formed of a bundle of fibers. A fiber ply has a fiber architecture, which refers to an ordered arrangement of the fiber tows relative to one another, such as a 2D woven ply or a 3D structure. The gaspath side 68 of the wall 61 may include an environmental barrier coating known in the industry.

The component 60 has one or more sensor sections 78 in which a bracket 80 is bonded on the wall 61 for holding a sensor 82. In the illustrated example, the bracket 80 is located on the non-gaspath side 70 of the wall 61. The type of sensor 82 is not particularly limited and may be a thermocouple, an acoustic sensor, or other type of sensor. The bracket 80 is formed of a material selected from CMC, graphite, and combinations thereof. If the bracket 80 is CMC, the CMC of the bracket 80 is the same as the CMC 72 that forms the wall 61.

Figure 3:
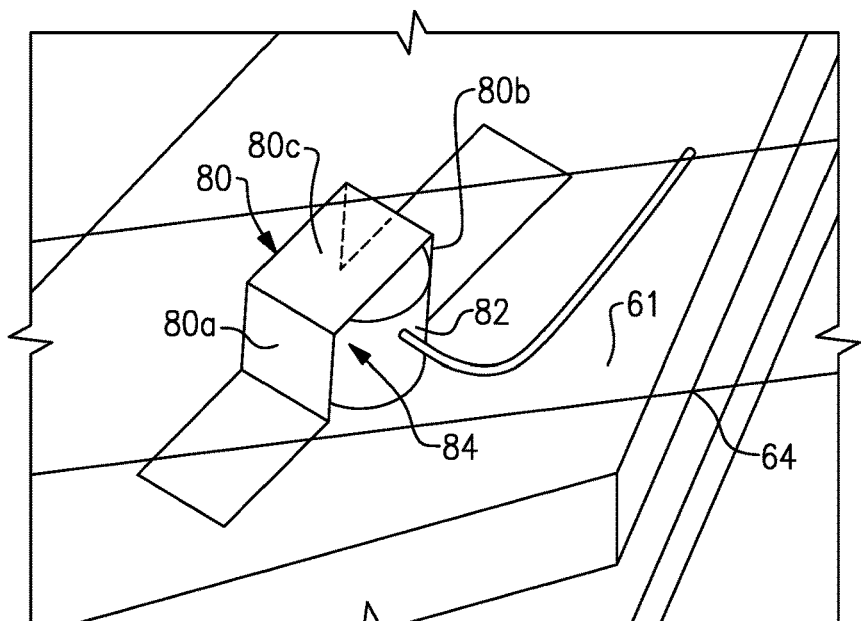
FIG. 3 illustrates an example bracket of the component.
Figure 4:
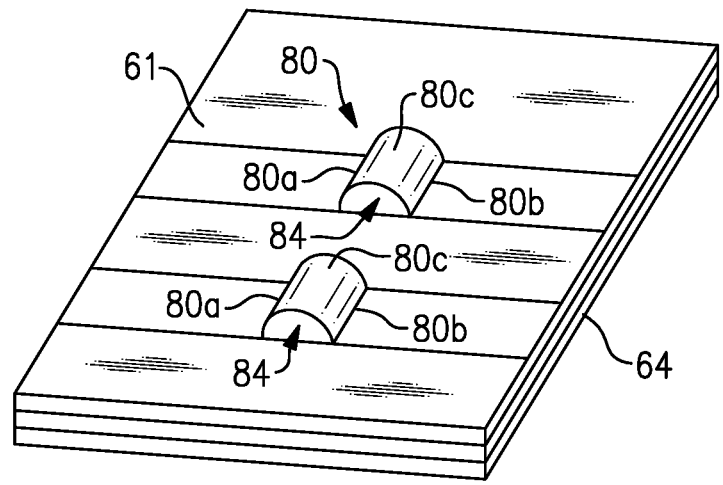
FIG. 4 illustrates another example bracket of the component.

FIG. 3 shows an example of the bracket 80. In this example, the bracket 80 is a U-bracket that has two upstanding bracket side walls 80a/80b and a header bracket wall 80c. The header bracket wall 80c connects the two upstanding bracket side walls 80a/80b. The wall 61, the two upstanding bracket side walls 80a/80b, and the header bracket wall 80c together define and a sensor receptacle 84 for receiving and securing the sensor 82. As shown, the bracket 80 is a single construction. However, as shown in FIG. 4, the bracket 80 may alternatively have a double construction in which there are two receptacles 84. In this case, there are two U-shaped bracket sections. The receptacles 84 are aligned such that a sensor can be slidingly received through both receptacles 84, to provide two regions for holding the sensor.

Figure 5:
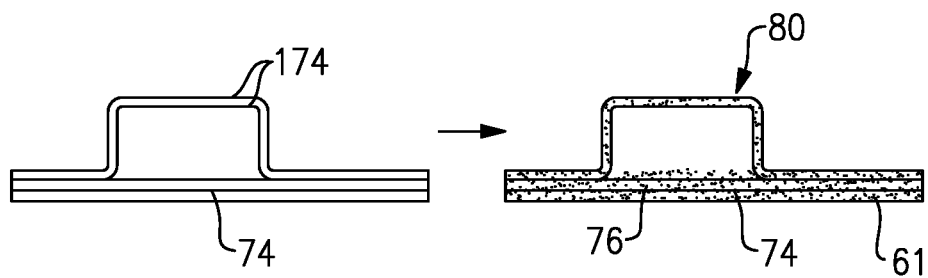
FIG. 5 illustrates a method of making a component with an integrated bracket.

The bracket 80 is integrated with the wall 61 so as to be bonded thereto. Such integration eliminates a need to adhere sensors or sensor holders with adhesives, which may be chemically incompatible with the CMC 72 or may be subject to dislodging due to a difference in thermal expansion. For example, as shown in FIG. 5, the bracket 80 is integrated with the wall 61 during fabrication of the component 60. Fabrication includes laying-up ceramic fiber plies 74 and then consolidating the ceramic fiber plies 74 in the ceramic matrix 76, such as by vapor infiltration of the ceramic matrix 76. During the fabrication, additional ceramic fiber plies 174 are laid-up to form a shape of the bracket 80. When the ceramic matrix 76 is deposited, it also consolidates the additional ceramic fiber plies 174 to thereby bond the bracket 80 on the wall 61. Thus, the ceramic matrix 76 bonds the bracket 80 on the wall 61. If desired, the additional ceramic fiber plies 174 can be held in position using a sacrificial adhesive, such as polyvinyl alcohol or polyvinyl butyral, that burns off during deposition of the over-coating 86. In a further example, the adhesive includes SiC particles. the SiC particles facilitate SiC nucleation and bonding between two textured surfaces during subsequent chemical vapor infiltration. In another example, the adhesive includes a preceramic polymer, such as polycarbosilane. The polymer initially acts as an adhesive but then thermally decomposes into a silicon-containing ceramic (e.g., SiC) that facilitates bonding.

Figure 6:
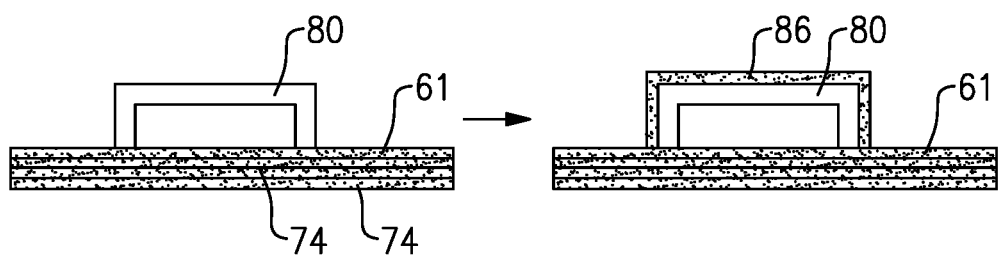
FIG. 6 illustrates another method of making a component with an integrated bracket.

Alternatively, as depicted in FIG. 6, the bracket is bonded on the wall 61 after fabrication. For example, the bracket 80 is pre-fabricated from graphite or CMC and then placed on the wall 61 (fully or partially fabricated). An over-coating 86 is then deposited that envelops the bracket 80 and the wall 61, to bond the bracket 80 on the wall 61. For example, deposition of the ceramic matrix 76 involves a final deposition iteration, to seal surface pores of the CMC 72. Prior to this final deposition iteration, the bracket 80 is placed on the wall 61. The material deposited by the final deposition iteration serves as a seal coating and as the over-coating 86 to bond the bracket 80 on the wall 61. The surface pores may facilitate mechanical bonding of the over-coating 86 to the wall 61, thereby enhancing bonding of the bracket 80. In this regard, the over-coating 86 may be the same material composition as the ceramic matrix 76, e.g., SiC. If desired, the bracket 80 can be held in position using a sacrificial adhesive that burns off during deposition of the over-coating 86.

The integration of the bracket 80 onto the wall 61 facilitates a robust attachment to hold the sensor 82 on the component 60, even at extreme temperatures where prior-used adhesives struggle to provide adequate strength. As a result, the bracket 80 may also reduce the need for re-attachment, thereby eliminating associated maintenance costs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a gas turbine engine component including a wall formed of a ceramic matrix composite (CMC) including ceramic fiber plies disposed in a ceramic matrix, the gas turbine engine component having a sensor section in which a bracket is bonded on the wall for holding a sensor,
   wherein the bracket being formed from a fiber ply of the CMC of the wall such that the ceramic matrix bonds the fiber ply of the bracket onto the wall, and
   the sensor being affixed on the gas turbine engine component by the bracket.

2. The gas turbine engine as recited in claim 1, wherein the bracket is a U-bracket that has two upstanding bracket side walls, a header bracket wall that connects the two upstanding bracket side walls, and the wall, the two upstanding bracket side walls, and the header bracket wall together define a sensor receptacle.

3. The gas turbine engine as recited in claim 1, wherein the gas turbine engine component is an airfoil.

4. The gas turbine engine as recited in claim 1, wherein the bracket is a U-bracket that has two upstanding bracket side walls and a header bracket wall that connects the two upstanding bracket side walls, and the fiber ply that forms the bracket is a top ply of the ceramic fiber plies.

5. A gas turbine engine comprising:
   a compressor section;
   a combustor in fluid communication with the compressor section; and
   a turbine section in fluid communication with the combustor, the turbine section having
      an airfoil having a wall formed of a ceramic matrix composite (CMC) including ceramic fiber plies disposed in a ceramic matrix, the airfoil having a sensor section in which a bracket is bonded on the wall, the bracket being formed from a fiber ply of the CMC of the wall such that the ceramic matrix bonds the bracket on the wall, and
      a sensor affixed on the airfoil by the bracket.

6. The gas turbine engine as recited in claim 5, wherein the bracket is a U-bracket that has two upstanding bracket side walls, a header bracket wall that connects the two upstanding bracket side walls, and the wall, the two upstanding bracket side walls, and the header bracket wall together define a sensor receptacle.

7. A method of making a gas turbine engine component, the method comprising:
   fabricating a wall of the gas turbine engine component by laying-up ceramic fiber plies and then consolidating the ceramic fiber plies with a ceramic matrix to form a ceramic matrix composite (CMC);
   bonding a bracket on the wall, the bracket is formed of from a fiber ply of the CMC such that the ceramic matrix bonds the bracket on the wall, wherein the bonding is conducted during the fabricating of the gas turbine engine component by laying-up additional ceramic fiber plies to form a shape of the bracket, wherein the consolidating also consolidates the additional ceramic fiber plies in the ceramic matrix material to thereby bond the bracket on the wall.

\* \* \* \* \*